United States Patent Office 3,575,917
Patented Apr. 20, 1971

3,575,917
METHOD OF STABILIZING CATALYZED ORGANOPOLYSILOXANES
Ales M. Kapral, Chicago, Ill., assignor to Dow Corning Corporation, Midland, Mich.
No Drawing. Filed Mar. 28, 1969, Ser. No. 811,659
Int. Cl. C08g 51/28, 5/12
U.S. Cl. 260—33.6                    9 Claims

ABSTRACT OF THE DISCLOSURE

A process for the preparation and a composition of a liquid, catalyzed, stable, curable silicon coating with an unlimited bathlife which is a combination of an organopolysiloxane, a polyalkoxysilane, an alcohol, an ester of orthosilicic acid and an organometal curing catalyst, preferably prepared with the aid of ultrasonic vibrations. Such product is perfectly stable and inactive in a solvent solution but easily activated by evaporation of the solvent to cure rapidly at a low temperature. It produces a superior release coating on paper or in film.

---

This invention relates to fluid, non-gelling compositions of organopolysiloxanes, alkoxysilanes and curing agents. More particularly, this invention relates to stable liquid formulations of organopolysiloxanes, organometallic curing catalysts, and alkoxysilanes in organic solvents which are stable coating compositions for paper, textiles, and other sheet materials, and for surfaces such as walls and roofs.

BACKGROUND OF THE INVENTION

Solutions of organopolysiloxane rubbers, fluids and resins in organic solvents containing relatively small quantities of organometallic curing catalysts are used as coating compostions for textiles, paper and similar cellulosic substances, and other sheet and web materials. These compositions are applied to the surface of paper, film or similar material in sheet, tape, fabric or woven form and the solvent is evaporated therefrom, leaving a thin film of organopolysiloxane and curing catalyst. At elevated temperature the catalyst causes the resin or rubber to cure to a hard, glossy surface which makes textiles water-repellent and which foms an anti-sticking and anti-blocking surface on paper and other sheet material.

Heretofore, such solutions of organopolysiloxanes and curing catalysts in organic solvents have been relatively unstable. The useful life of such compositions has usually been less than one day and often only a few hours, even at low temperature. The curing catalyst causes the organopolysiloxane to cure or condense with itself to form a thermoset, high molecular weight, relatively insoluble, organopolysiloxane polymer. As such polymers are insoluble in organic solvents, their usefulness in coating compositions is seriously decreased. Furthermore, even curing or polymerization to a point short of insolubility in the solvent is undesirable since the nature of the polymer in the coating bath changes with time so that the coating as applied to the sheet material or fabric is not the same at the end of the application as it is at the start thereof, and a uniform coating is not obtained.

In view of the foregoing, it has been long desired to prepare stable solutions of organopolysiloxanes and curing catalysts in organic solvents for coating purposes. Such stable solutions should remain clear and in one phase for extended periods of time even at elevated temperature. The organopolysiloxane of the compositions should remain substantially unchanged and should produce the same type of film on the textile or sheet material at any point during its application.

It is well know in the art that the temperature required to cure organopolysiloxanes (250° F.) softens polyethylene which is increasingly used as a substrate for silicones, either being supported by paper (predominently kraft) or as unsupported film. It is thus important to produce organopolysiloxane compositions which can be cured at low temperature (less than 200° F.). It is also important to produce such compositions which can be rapidly cured in less than a minute at low temperature because this allows high coating speeds of 1000–2000 feet per minute.

It is a primary object of this invention to provide stable fluid compositions of organopolysiloxanes and curing agents.

It is a further object of this invention to provide stable solutions of organopolysiloxanes in organic solvents and curing catalysts.

A further object is to provide improved non-blocking silicone coating compositions for paper and other sheet and web materials.

An additional object is to provide organopolysiloxane compositions which cure rapidly at low temperature. Further objects include providing non-blocking coatings which are not tacky and do not smear, which allow permanent differential release values on two sides of polyethylene-coated paper or film and which provide a secure bond to polyethylene. These and other objects are apparent from and are achieved in accordance with the following disclosure.

GENERAL DESCRIPTION OF THE INVENTION

In accordance with this invention, stable fluid compositions are prepared by combining a polyorganosiloxane and an organometallic curing agent with a relatively small quantity of a silane, alcohol and/or orthosilicate ester, preferably under ultrasonic vibration. Such compositions are stable for extended periods of time and can be diluted with organic solvents to form stable coating formulations. In a preferred embodiment of the invention, an organic orthosilicate ester, is added in relatively small quantities equal to about 0.05% to 5% of the weight of the organopolysiloxane. Such combinations are exceedingly stable and do not form gels or increase in viscosity over extended periods of time, yet cure rapidly at relatively low temperature.

DETAILED DESCRIPTION OF THE INVENTION

The organopolysiloxanes to which this invention pertains are well known to the art and include the dialkylpolysiloxanes, the monoalkylpolysiloxanes, the monoarylpolysiloxanes, the arylalkylpolysiloxanes, the diarylpolysiloxanes, and mixtures and copolymers of such organopolysiloxanes. These materials have the general formulas

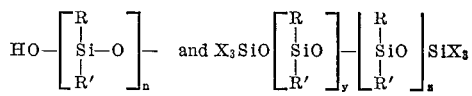

wherein R is an aliphatic, aliphatic-aromatic or aromatic hydrocarbon radical containing 1 to 18 carbon atoms, R' is an aliphatic, aliphatic-aromatic or aromatic hydrocarbon radical containing 1 to 18 carbon atoms or hydrogen, X is an aliphatic, aliphatic-aromatic or aromatic hydrocarbon radical containing 1 to 18 carbon atoms, $n$ is a positive integer from 10–1000, $y$ is an integer from 1 to 1000, and $z$ is an integer from 0 to 1000, the value of $n$ and $y+z$ being such that the viscosity of the product at 25° C. is between 20 cps. and 1,000,000 cps. Preferred are mixtures of the two types of organopolysiloxanes illustrated above containing 1–20% of one type and 80–99% of the other. Such organopolysiloxanes are produced commercially as fluids, as resins or as rubbers. Those preferred in this invention are generally soluble or miscible in organic solvents such as aliphatic hydrocarbons, aromatic hydrocarbons, halogenated aliphatic hydrocarbons, and aliphatic esters and ketones. They are generally marketed in the form of solutions of from 10% to 35% concentration in organic solvents, although there are some organopolysiloxane fluids which are readily handled without solution in solvents and are supplied on a 100% solids basis.

The organopolysiloxane fluids, rubbers and resins preferably have viscosities in the range from 100 cps. to 10,000 cps. However, viscosities from 20 cps. to 1,000,000 cps. (in the undiluted state) have been successfully employed. The resins that are operative include methylpolysiloxane, dimethylpolysiloxane, ethylpolysiloxane, diethylpolysiloxane, phenylpolysiloxane, methylphenylpolysiloxane, methylvinylpolysiloxane, and related compounds such as those disclosed in U.S. Pats. 2,728,692; 2,807,601; 2,491,843; 2,588,366; 3,154,431; 2,258,222; 2,258,219; 2,352,974 and 2,843,555. Preferred are the organopolysiloxanes in which at least 50% of the substituents on the silicon atoms are methyl.

The added components serving as stabilizers and weak bond crosslinking agents are alcohols, such as methyl alcohol, ethyl alcohol, propyl alcohol, butyl alcohol, amyl alcohol, hexyl alcohol, heptyl alcohol and octyl alcohol; ethers, such as dimethyl ether, diethyl ether, methyl butyl ether and diamyl ether; esters, such as amyl acetate, methyl octoate, butyl propionate and alkyl and aryl esters of orthosilicic acid. Any combination of above is possible. Alcohols can be anhydrous and pure or denatured. Traces of water in alcohol are tolerated.

Other added components, serving as cure promoters, are polyalkoxysilanes of the general formula

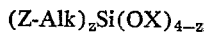

$$(Z-Alk)_zSi(OX)_{4-z}$$

wherein Alk is a bivalent organic radical, such as an alkylene radical, containing 2 to 6 carbon atoms, X is an alkyl, aralkyl, alkaryl or aryl radical containing 1 to 10 carbon atoms, Z is hydrogen or amino, and z is a positive integer from 1 to 3. Among such alkoxysilanes are ethyltriethoxysilane, amyltriethoxysilane, vinyltriethoxysilane, phenyltriethoxysilane, methyltriethoxysilane, dimethyldiethoxysilane, phenyltrimethoxysilane, amyltrimethoxysilane, methyltrimethoxysilane, dimethyldimethoxysilane, methylphenyldimethoxysilane, and diphenyldimethoxysilane. A similar and preferred group of alkoxysilanes are the aminoalkylalkoxysilanes of the foregoing formula wherein Z represents H₂N, as described in British Pat. No. 1,111,156. Preferred members of this group are γ-aminopropyltriethoxysilane, γ-aminopropyltriisopropoxysilane, γ-aminopropyltributoxysilane, β-aminoethyltriethoxysilane, β-aminoethyltrimethoxysilane, γ-aminopropyltrimethoxysilane, δ - aminobutyltriethoxysilane, N - (β-aminoethyl) - γ - aminopropyltrimethoxysilane and N-(β-aminoethyl) - δ - aminobutyltriethoxysilane. These substances are particularly effective in stabilizing formulations of organopolysiloxanes, organometallic curing agents, alcohols, and organic esters of orthosilicic acid.

My compositions contain one or more of the well known organometallic, organopolysiloxane curing agents or catalysts. The preferred curing agents are salts of tin, cobalt, lead, zinc, zirconium and iron with organic acids. Preferred are salts such as zinc, cobalt and tin naphthenates, tin and lead oleates, zinc, iron and tin octoates, tin acetate, dibutyltin dilaurate, dibutyltin dioctoate, and dibutyltin diacetate. Organometallic curing agents or catalysts for organopolysiloxanes are well known in the art and are described, for example, in "Silicones" by Meals and Lewis, Reinhold Publishing Corporation, New York, 1959, particularly at pages 64, 114–116 and 118–119, and in "Silicones" by Fordham, George Newnes Limited, London, 1960, particularly at pages 198 and 237–238.

The quantity of the curing agent or catalyst in the composition is not critical, so long as the quantity is sufficient to cause the organopolysiloxane to cure rapidly at elevated temperature after the coating has been applied to a surface. Usually the amount of curing agent or catalyst (dry or solids basis) is in the range from 0.1% to 2% of the weight of the organopolysiloxane in the composition.

The organopolysiloxane is the major active component of these compositions and can be diluted with a non-active inert solvent, such as aliphatic, aromatic or chlorinated hydrocarbons. Often the organopolysiloxane is used undiluted but for coating purposes it is usually diluted with solvent to 0.5% to 50% concentration.

Quantities of added components are minute, so minute in fact that before use they are usually diluted in a solvent, such as methylene chloride, before addition to the compositions. Extremely small variations in quantities produce different viscosities and different shelf or bath lives of the final compositions. Besides inert solvents forming a part of my composition other inert components may be used—for instance, inert fillers or pigments, or organic dyes.

Dispersion of components is of utmost importance and the preferred method used is the dispersion by ultrasonic waves. Preparation by a simple mixing of components generally provides prolonged bath life, especially when higher quantities of alcohol are used, but the weak crosslinking and polymerization continue in the composition, which thickens within a few days. Ultrasonic dispersion of silane in alcohol with esters produces a surprising result of stability, with up to several years of bath life.

Ultrasonic equipment used in producing compositions in accordance with my invention can be ultrasonic generator (e.g. 1.2 kw.) transmitting vibrations at frequencies of 16,000 to 20,000 cycles per second to the container with the composition, or the composition can be pumped against oscillating ultrasonic vibrator of the same frequency placed in the path of the stream. Such equipment is manufactured by Baron-Blakeslee Corporation in California or Sonic Engineering in New Jersey. Low-amplitude vibrators having frequencies suitable for sonar equipment are satisfactory, as well as high-amplitude acoustic wave apparatus widely used in cleaning metal parts (e.g. watches).

In a preferred embodiment of this invention, the compositions of organopolysiloxanes and organometallic curing agents are stabilized with a combination of an alkoxysilane, an aliphatic alcohol and an organic orthosilicate. Ordinarily, organic orthosilicates such as tetraalkyl or tetraaryl orthosilicates form stable compositions with organopolysiloxanes and organometallic curing agents, as disclosed in my co-pending application Ser. No. 724,213 filed Apr. 25, 1968, but in such formulations the amount of tetraalkyl orthosilicates must be equal to or greater than the amount of the organopolysiloxane. However, when the organic orthosilicate is combined with the alkoxysilane and alcohol, it is possible to use substantially less of the organic orthosilicate and still obtain stable formulations with traces only of stabilizing agents.

Among the organic orthosilicates which can be used are esters such as tetraethyl orthosilicate, tetramethyl orthosilicate, tetraphenyl orthosilicate and similar organic silicates of the general formula

$$Si(OR)_4$$

wherein R represents any of the monovalent organic radicals such as lower alkyl radicals containing 1 to 6 carbon atoms, or lower aryl or alkaryl radicals containing 6 to 8 carbon atoms. It has been found that such compositions of organopolysiloxane fluids or resins, organometallic curing agents or catalysts, alkoxysilanes, and organic silicate esters are highly stable in organic solvents and can be maintained for a year or more at room temperature without substantial change in the nature of the organopolysiloxane or without forming precipitates or cloudiness in the organic solution. The curing agent or catalyst is present in an amount sufficient to effect polymerization under ordinary circumstances, that is, without the presence of the stabilizer. Usually the amount of organometallic curing agent (solids) is from 1% to 5% of the weight of the organopolysiloxane although smaller amounts from 0.2% are effective.

The polyalkoxysilane component usually amounts to about 0.02–0.1% of the weight of the organopolysiloxanes, and "stabilizing" ranges from 0.01% to 0.3% are effective. Larger amounts contraindicate stabilizing effect. When an organic ester of orthosilicic acid is present (e.g. tetraethyl orthosilicate) it amounts to 0.01% to 0.5% of the weight of the organopolysiloxane, although larger amounts are operative but generally unnecessary. Alcohols or ethers usually amount to about 1% of the weight of the organopolysiloxane and ranges from 0.1% to 30% are effective, producing different degrees of viscosity and different bath lives. In the presence of chlorinated solvent, traces of water can be tolerated without imparting cloudiness.

The organopolysiloxane compositions of this invention are particularly useful as release coatings for paper and other sheet materials. Sheet materials coated with these compositions will not stick or cling even to such tacky materials as pressure-sensitive adhesives, raw rubber, tar, asphalt and "Scotch" tape. The coating compositions can be applied to glassine, vegetable parchment, super-calendared kraft paper, sized kraft paper, metal foils and films of plastics such as cellophane, polyethylene, polypropylene, vinyl resins, acrylic resins, polyamide resins and polyester resins. The organopolysiloxane coating is cured by heating at elevated temperatures for short periods of time to form a smooth, transparent, hard, flexible, thermoset coating. The color and appearance of the paper or other sheet material is not altered.

In the organopolysiloxane coating formulations which have been used heretofore, the maximum amount of organopolysiloxane in the coating bath has been about 5%. Concentrations above 5% have been unsatisfactory because of the tendency of the organopolysiloxanes to further polymerize rapidly and set in the bath. In the stabilized composition of this application, however, it is possible to use increased concentrations of organopolysiloxanes in the coating bath in the range from 5% to 80%, although 2% silicone (solids basis) concentration is preferred for coating compositions. This concentration, used on paper or unsupported film, produces a release coating equal to 5% concentration of conventional silicone coating formulations.

It has also been found that the compositions of this application produce a uniform silicone coating on textiles and sheet materials which cannot be produced from the organopolysiloxane solutions used heretofore. In addition to uniformity, these solutions produce a hard, non-photosensitizing coat which can be cured at low temperature and which does not rub off, flake or chip, haze, or migrate into adjacent materials. The silicone coatings produced with the compositions of this application have superior affinity to dimensionally stable materials. For instance, two-side coated Polykraft paper, that is, kraft paper coated on both sides with polyethylene, can be coated on both sides with my organopolysiloxane compositions and fully cured, without blocking. This cannot be done with prior organopolysiloxane compositions.

The organopolysiloxane compositions of this application can be applied to paper or other sheet material by other conventional coating methods. Suitable methods include knife-over-roll, knife-over-blanket, wire-wound rod, smoothing bars, kiss roll, squeeze roll, reverse roll, engraved roll or spray applicators. Other satisfactory coating equipment includes trailing blade coaters, roll coaters and the hairbrush coaters. Spraying or printing can also be used.

The amount of organopolysiloxane applied to paper or other sheet materials is usually in the range from 0.1 to 1 pound per ream of paper (3,000 square feet) coated on one side.

The organopolysiloxane coating formulations of the prior art are cured by evaporating the solvents and applying heat for periods of time varying from 20 to 40 seconds at 350° F. to as long as 2 to 3 minutes at 225° F. to 250° F. The coating compositions of this invention, however, can be cured in the temperature range from 150° F. to 250° F. in less than one minute. Curing at 200° F. for 2–5 seconds is preferred for paper. With plastic films lower temperatures, such as 150° F. for 20 seconds, may be used.

The organic solvents in which the compositions of this invention are soluble are well known in the silicon art and include halogenated aliphatic hydrocarbons such as chloroform, methylene chloride, ethylene chloride, carbon tetrachloride, perchloroethylene and the like; aromatic hydrocarbons such as benzene, toluene and xylene; aliphatic and alicyclic hydrocarbons such as mineral spirits, naphthenes, hexane, heptane, cyclohexane and kerosene; and other organic solvents such as butanol, dioxane, diisopropyl ether and related materials.

The coating which is produced on fabric or sheet material is a film of flexible, cured organopolysiloxane. The film is clear, glassy and transparent, yet hard enough to resist abrasion and rub-off.

It is possible to add viscosity-increasing ingredients such as ethylcellulose, vinyl resins, and similar materials which increase the viscosity of the coating formulations in situations where the coating equipment requires higher viscosities suitable for application.

In a preferred embodiment of the invention, an amine such as morpholine is added to the silicon solution in quantity sufficient to adjust the pH to 7.0 to 9.0, and preferably to 7.5–8.0. The amine is usually one having a basic dissociation constant between $1 \times 10^{-3}$ and $1 \times 10^{-6}$ at 25° C. and a boiling point between 90° C. and 150° C. Included in this group are piperidine, piperazine, pyrrolidine, dipropylamine, ethylenediamine, isoamylamine, dipropylamine and similar aliphatic and alicyclic amines. On aging, the solution usually decreases slightly in pH to a value very close to 7.0.

The invention is disclosed in further detail by means of following examples which are provided for the purposes of illustration only, and it will be apparent to those skilled in the art that various modifications in materials, quantities and operating procedures may be made without departing from the invention herein disclosed. In these examples, parts of materials represent parts by weight, percentages are by weight, and temperatures are in degrees centigrade (unless otherwise indicated).

EXAMPLE NO. 1

This is a CONTROL showing useful pot life of approximately one hour. It was prepared, as all other following examples, from commercially available materials.

290 parts of commercial 30% solution of organopolysiloxane gum (Syl-Off 23 of Dow Corning Corporation), 25 parts of inert solvent, such as hexane, and 5 parts of 50% solution of commercial dibutyltin dilaurate (Syl-Off 23A of Dow Corning Corporation). Materials are stirred together until thoroughly dissolved. Within 20 minutes the solution starts to thicken, within 30 minutes is completely jellified and within one hour it forms a solid, irreversible gel.

EXAMPLE NO. 2

290 parts of commercial 30% solution of organopolysiloxane gum (Syl-Off 23 of Dow Corning), 25 parts of pure ethyl alcohol, and 5 parts of 50% solution of commercial dibutyltin dilaurate (Syl-Off 23A of Dow Corning). After a through mixing in the same manner as in Example No. 1, the composition starts gradually thickening and reaches a state of gel within 20 hours. This composition forms a coating on polyethylene-coated paper which is easily rubbed off.

EXAMPLE NO. 3

290 parts of commercial 30% solution of organopolysiloxane gum (Syl-Off 23 of Dow Corning), 25 parts of ethyl alcohol (denaturated, SDA-3A, 10 gal. isopropyl alcohol, 1 gal. methyl isobutyl ketone for 100 gals of alcohol), and 5 parts of 50% solution of commercial dibutyltin dilaurate (Syl-Off 23A of Dow Corning). After mixing in the same manner as in Example No. 1, the composition starts to thicken slowly and reaches a state of gel within 40 hours. Coatings of this composition on paper are of similar quality to those of Example 2.

EXAMPLE NO. 4

290 parts of commercial solution of organopolysiloxane gum (Syl-Off 23 of Dow Corning), 25 parts of isopropyl alcohol, and 5 parts of 50% solution of commercial dibutyltin dilaurate (Syl-Off 23A of Dow Corning). After a thorough mixing, the composition starts to thicken and reaches the state of gel within 90 hours. The structure of the polyorganosiloxane is altered and coatings of it do not adhere solidly to the substrate.

EXAMPLE NO. 5

290 parts of commercial 30% solution of organopolysiloxane gum (Syl-Off 23 of Dow Corning), 0.3 part of γ-aminopropyltriethoxysilane dissolved in 24.7 parts of hexane, and 5 parts of 50% solution of commercial dibutyltin dilaurate (Syl-Off 23A of Dow Corning). After a thorough mixing as in Example No. 1, the composition reaches a state of unmovable gel. The gel starts to move again after 24 hours and remains almost solid, yet flowing, after 14 days. It can readily be dissolved in hydrocarbon or chlorinated hydrocarbon solvents. This formulation forms acceptable coatings on paper.

EXAMPLE NO. 6

290 parts of commercial 30% solution of organopolysiloxane gum (Syl-Off 23 of Dow Corning), 0.3 part of γ-aminopropyltriethoxysilane dissolved in 24.7 parts of isopropyl alcohol, and 5 parts of 50% solution of commercial dibutyltin dilaurate (Syl-Off 23A of Dow Corning). After a thorough mixing as in Example No. 1 the bath life of the composition is approximately one month, without visible change in viscosity.

EXAMPLE NO. 7

290 parts of commercial 30% solution of organopolysiloxane gum (Syl-Off 23 of Dow Corning), 0.3 part of γ-aminopropyltriethoxysilane, 0.3 part of ethyl orthosilicate condensed (containing not more than 10% of polyethyl silicate), 0.6 part of isopropyl alcohol dissolved in 28.8 parts of high boiling aliphatic hydrocarbon solvent (Alcylac of Thompson-Hayward Chemical Company), and 5 parts of 50% solution of dibutyltin dilaurate. This solution (prepared in similar manner to Example No. 1) has a useful bath life of approximately 3 months, with good coating qualities.

EXAMPLE NO. 8

Everything remains the same as in the Example No. 7 except that γ-aminopropyltriethoxysiloxane, ethyl orthosilicate condensed, and isopropyl alcohol are mixed together and then exposed to ultrasonic vibrations of 1.2 kw. for 30 minutes. Shelf life of such composition is over 6 months without any noticeable change in viscosity.

EXAMPLE NO. 9

0.3 part of γ-aminopropyltriethoxysilane, 0.3 part of ethyl orthosilicate condensed (containing not more than 10% of polyethyl silicate), 0.6 part of isopropyl alcohol are mixed thoroughly together and then exposed to ultrasonic waves of 1.2 kw. for 30 minutes. Then 28.8 parts of high boiling aliphatic hydrocarbon solvent (Alcylac of Thompson-Hayward) are added, and all is mixed in 290 parts of commercial 30% solution of organopolysiloxane gum (GE S-4026 of General Electric). Then 5 parts of a 50% solution of dibutyltin dilaurate are added. Shelf life of this composition is over 6 months without any noticeable change in viscosity. This composition was a good coating for polyethylene-coated paper which was resistant to rubbing off.

EXAMPLE NO. 10

0.3 part of γ-aminopropyltriethoxysilane, 0.3 part of ethyl silicate condensed (containing not more than 10% of polyethyl silicate), and 0.6 part of isopropyl alcohol are thoroughly mixed together and then exposed to ultrasonic vibrations of 1.2 kw. for 30 minutes. Then 28.8 parts of high boiling aliphatic hydrocarbon solvent (Alcylac of Thompson Hayward) are added and all is mixed in 290 parts of 30% solution of dimethylpolysiloxane in hexane (Union Carbide Y 4112), and 5 parts of 50% solution of dibutyltin dilaurate. Shelf life of this composition is over 6 months without any noticeable change in viscosity.

EXAMPLE NO. 11

A mixture of 100 parts of 30% solution of dimethylpolysiloxane rubber (Syl-Off 23), 1 part of dibutyltin dilaurate and 0.3 part of amyltriethoxysilane was prepared by dissolving the latter components in the first component with good agitation and slight warming to 60–80° F. The solution thus prepared was stable at 60–80° F. for three to four weeks, whereas the formulation without amyltriethoxysilane gels in one hour at room temperature.

EXAMPLE NO. 12

A solution of 1 part of γ-aminopropyltriethoxysilane in 100 parts of tetraethyl orthosilicate was mixed with the aid of ultrasonic waves and then was admixed with 200 parts of low-viscosity dimethylpolysiloxane (Syl-Off 291). The mixture was heated for 30 minutes on a steam bath with agitation until a homogenous fluid was produced. This was cooled at room temperature and to it was added 5 parts of dibutyltin dilaurate. On standing at room temperature this solution became quite viscous in the next 20 to 30 minutes but after 3 to 4 hours, the viscosity decreased and the composition became fluid. After 20 hours, the final viscosity of the composition was essentially the same as the low-viscosity dimethylpolysiloxane used as a starting material. On standing at room temperature for 6 months, there was no significant change in the viscosity of this material.

Ten parts of the foregoing composition was dissolved in 1000 parts of methylene chloride. The resulting solution was applied to polyethylene-coated kraft paper at the rate of 1000 feet per minute. The paper was passed through an oven at 200° F. in a period of 2 seconds and the paper as it emerged had a hard, non-tacky, non-smearing silicone film thereon which had a Keil number of 10 grams per square inch.

EXAMPLE NO. 13

A coating bath composition was produced by mixing 100 parts of a 30% solution of dimethylpolysiloxane rubber in xylene (Syl-Off 23 of Dow Corning Corporation, viscosity 10,000 cps.), 50 parts of tetraethyl orthosilicate and 0.5 part of γ-aminopropyltriethoxysilane, subject to ultrasonic vibration for 30 minutes. After the materials were mixed with warming to form a homogenous solution, the product was cooled to room temperature and 10 parts of a 50% solution of zinc-lead naphthenate in xylene was added with agitation. The resulting composition was fluid but, on standing at room temperature for one-half hour, it became increasingly viscous. After three hours at room temperature the viscosity decreased and the composition resumed the original fluidity of the dimethylpolysiloxane solution which was used as a starting material. It was a suitable coating composition for polyethylene, polypropylene, or polyamide film (unsupported) or paper on high-speed coating machines.

EXAMPLE NO. 14

To a solution of 100 parts of low-viscosity dimethylpolysiloxane (Syl-Off 291) in 150 parts of mineral spirits was added 50 parts of tetramethyl orthosilicate and 2 parts of tin octoate. On standing at room temperature the material became increasingly viscous and after 6 hours it formed a relatively thick gel. When the same combination was prepared containing 1 part of amyltriethoxysilane it was stable at room temperature for more than a week and was still fluid enough for application to paper by commercial coating equipment.

EXAMPLE NO. 15

To 100 parts of low-viscosity dimethylpolysiloxane (3500 centistokes at 77° F.) was added 10 parts of tetraethyl orthosilicate containing 1% by weight of γ-aminopropyltriethoxysilane. The resulting composition was thoroughly mixed, heated to 100° F. for one hour, cooled to 20° F. and diluted with 180 parts of mineral spirits. To this solution was added 10 parts of zinc and tin octoate solution (5% by weight in methylene chloride). The resulting composition became relatively viscous in one-half hour and then in 2 to 3 hours became fluid. It contained ⅓ silicone solids on a weight basis.

EXAMPLE NO. 16

200 parts of low molecular weight dimethylpolysiloxane (Syl-Off 291) and 100 parts of low-viscosity methylpolysiloxane fluid (Syl-Off 1107) were mixed for 30 minutes. Next, 20 parts of a 1% solution of γ-aminopropyltriethoxysilane in tetraethyl orthosilicate were added with mixing and the resulting solution heated at 100° C. for one hour with continued mixing. Then, 5 parts of a 50% solution of dibutyltin dilaurate in aromatic solvent was added. The solution was maintained at 100° C. for one hour under low vacuum with mixing. Finally, 15 parts of a 50% solution of dibutyltin dilaurate in aromatic solvent was added with mixing and the solution was allowed to cool to 22° C. under vacuum. The solution was stable and fluid at ambient temperature for at least 4 months. It could be applied at a speed of 750 feet per minute to paper heated at 200–250° F. in a 30-foot oven.

EXAMPLE NO. 17

A silicone composition was produced as in Example No. 16 from 200 parts of dimethylpolysiloxane (Syl-Off 291), 200 parts of methylpolysiloxane (Syl-Off 1107), 20 parts of a 1% solution of γ-aminopropyltriethoxysilane in isopropyl alcohol, subjected to ultrasonic vibration, and 25 parts of 50% solution of dibutyltin dilaurate in xylene (added in three portions of 5, 10 and 10 parts respectively). The resulting composition was diluted with 5% mineral spirits and formed a stable, fluid solution of relatively low viscosity. One part of this solution diluted with 100 parts of mineral spirits was an excellent release coating for paper. It could be cured at 200° F. in 2 seconds to a hard, non-flaking coating.

EXAMPLE NO. 18

200 parts of low-viscosity (3500 cst. at 77° F.) dimethylpolysiloxane (Syl-Off 291, Dow Corning Corporation) was admixed with 0.2 part of γ-aminopropyltriethoxysilane of the formula.

and 5 parts of dibutyltin dilaurate. The resulting composition could be stored at room temperature for several days without any significant change in viscosity. It could be diluted with organic solvents and applied as a release coating agent to paper.

EXAMPLE NO. 19

A mixture of 10 g. of methylvinyldichlorosilane and 20 g. of tetraethyl orthosilicate, adjusted to pH 7.5 with morpholine, was subjected for 30 minutes to ultrasonic vibration at 25 kilocycles, forming a uniform solution. The latter was diluted with 2970 g. of mineral spirits to produce a 1% (solids basis) solution.

Then 20 g. of the foregoing solution was added to 200 g. of a 30% solution of high molecular weight methylhydrogenpolysiloxane (Syl-Off 23) and thoroughly mixed. The resulting solution was allowed to stand at room temperature for an hour, then to it was added 3 g. of a 50% solution of dibutyltin dilaurate in hexane. The organopolysiloxane solution was stable at room temperature for several months. When diluted to 2% silicone content (solids basis) with methylene chloride it formed a coating composition which, when applied to glassine, cured rapidly at 150° F.

EXAMPLE NO. 20

To a solution of 100 g. of low molecular weight dimethylpolysiloxane (100% on dry weight or solids basis) (Syl-Off 291) in 200 g. of xylene was added 30 g. of a 1% solution of methylvinyldichlorosilane and tetraethyl orthosilicate in mineral spirits (prepared as in Example No. 19), followed by 2 g. of a 50% solution of dibutyltin dilaurate in hexane. The resulting silicone solution had excellent shelf life. When diluted to 3% silicone with methylene chloride, it formed a coating composition which cured at 150° F.

EXAMPLE NO. 21

A mixture of 10 g. of β-(3,4-epoxycyclohexyl)ethyltrimethoxysilane and 30 g. of tetramethyl orthosilicate was subjected to ultrasonic vibration (22 kilocycles) for 30 minutes. It was then diluted with 2970 g. of high boiling aliphatic hydrocarbon solvent (flash point 120° C.) and adjusted to pH 7.5 with morpholine.

Thirty grams of the foregoing solution was diluted with 200 g. of low boiling aliphatic hydrocarbon solvent (flash point 80° C.) and then 100 g. of low molecular weight organopolysiloxane (Syl-Off 291) was added, followed by 2 g. of a 50% solution of dibutyltin dilaurate in hexane. The resulting composition was stable for several months and when applied to paper it produced a coating which cured rapidly at low temperature (100–150° F.) and had excellent adhesion.

EXAMPLE NO. 22

Four coating compositions were produced by the method of Example No. 21, using respectively (a) vinyltrichlorosilane, (b) γ-glycidoxypropyltrimethoxysilane, (c) vinyltriethoxysilane, and (d) methylvinyldichlorosilane, instead of β-(3,4-epoxycyclohexyl)ethyltrimethoxysilane. Each of these compositions was stable on storage and cured rapidly at 150–170° F. when coated on paper.

EXAMPLE NO. 23

Four coating compositions were produced by the procedure of Examples Nos. 21 and 22, each containing 200 g. of a 30% (solids basis) solution of high molecular weight organopolysiloxane in xylene (Syl-Off 23), 20 g. of the 1% solutions (a), (b), (c) and (d), respectively, of Example No. 22, and 1 g. of a 50% solution of dibutyltin dilaurate in hexane. All were stable at room temperature for at least two months and cured rapidly to produce superior coatings on paper.

I claim:

1. The method of stabilizing against gellation a mixture of an organopolysiloxane in which the substituent groups are aliphatic, aliphatic-aromatic or aromatic hydrocarbon radicals all of 1 to 18 carbon atoms, or hydrogen atoms and an organometallic curing catalyst for said siloxane in amount to cure the organopolysiloxane, which comprises incorporating in said mixture from 0.1 to 0.3% by weight based on the organopolysiloxane of an organic silane of the formula $(ZAlk)_zSi(OX)_{4-z}$ in which Z is hydrogen, amino, N-beta-aminoethyl, 1,2 - epoxy or the glycidoxy group, Alk is a bivalent or trivalent hydrocarbon radical containing 2 to 6 carbon atoms, X is alkyl, aryl, aralkyl or alkaryl hydrocarbon radical of 1 to 10 carbon atoms and z is an integer from 1 to 3 and sufficient amine to maintain the pH at 7 to 9.

2. The method of claim 1 in which the composition contains from 0.01 to 30% by weight (based on the weight of the organopolysiloxane) of an alcohol.

3. A method of claim 1 in which the composition contains 0.05 to 5% based on the weight of the organopolysiloxane of an organic orthosilicate.

4. The method of claim 1 in which the amine has a dissociation constant between $1 \times 10^{-3}$ and $1 \times 10^{-6}$ at 25° C. and a boiling point between 90° C. and 150° C.

5. The method of claim 1 in which the organopolysiloxane is dissolved in an aliphatic hydrocarbon, an aromatic hydrocarbon or a chlorinated hydrocarbon solvent in a concentration of from 0.5 to 80% by weight of the combination of organopolysiloxane and solvent.

6. The method of claim 5 in which the organopolysiloxane contains silicon-bonded hydrogen.

7. The method of claim 1 in which the mixture is subjected to ultrasonic vibrations.

8. The method of claim 5 in which the ingredients are subjected to ultrasonic vibrations.

9. The method of claim 6 in which the ingredients are subjected to ultrasonic vibrations.

References Cited
UNITED STATES PATENTS

| | | | |
|---|---|---|---|
| 3,436,251 | 4/1969 | Rees | 117—155 |
| 3,436,252 | 4/1969 | Neuroth | 260—46.5(G)X |

MORRIS LIEBMAN, Primary Examiner

L. T. JACOBS, Assistant Examiner

U.S. Cl. X.R.

260—33.8, 46.5